(12) United States Patent
Lin et al.

(10) Patent No.: US 7,725,634 B2
(45) Date of Patent: May 25, 2010

(54) MICROPROCESSOR DEVICE AND RELATED METHOD FOR A LIQUID CRYSTAL DISPLAY CONTROLLER

(75) Inventors: Wen-Hsuan Lin, Taipei County (TW); Chun-Liang Chen, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 63 days.

(21) Appl. No.: 12/127,793

(22) Filed: May 27, 2008

(65) Prior Publication Data

US 2009/0254688 A1     Oct. 8, 2009

(30) Foreign Application Priority Data

Apr. 2, 2008    (TW) .............................. 97111991 A

(51) Int. Cl.
*G06F 13/00* (2006.01)
(52) U.S. Cl. ...................... 710/240; 711/151; 345/501; 345/531; 345/535; 345/536
(58) Field of Classification Search ................ 710/240, 710/241, 243, 244; 711/100, 147, 450, 151, 711/152; 345/501–504, 520, 531, 535, 536, 345/541, 204
See application file for complete search history.

(56) References Cited

U.S. PATENT DOCUMENTS

| | | | | |
|---|---|---|---|---|
| 5,630,128 A * | 5/1997 | Farrell et al. | ................. | 718/103 |
| 7,321,438 B2 * | 1/2008 | Kaizu | ........................ | 358/1.15 |
| 2003/0120877 A1 * | 6/2003 | Jahnke | ........................ | 711/150 |
| 2004/0024976 A1 * | 2/2004 | Mes | ............................ | 711/151 |
| 2006/0022985 A1 * | 2/2006 | Shepherd et al. | ............ | 345/535 |
| 2006/0082586 A1 * | 4/2006 | Noorbakhsh et al. | ........ | 345/535 |
| 2007/0136545 A1 * | 6/2007 | Kommrusch et al. | ........ | 711/169 |
| 2007/0285428 A1 * | 12/2007 | Foster et al. | ................ | 345/503 |

* cited by examiner

*Primary Examiner*—Glenn A Auve
(74) *Attorney, Agent, or Firm*—Winston Hsu

(57) ABSTRACT

To reduce production cost, the present invention provides a microprocessor device for an LCD controller, which includes a memory, a first processing unit, a second processing unit, a first arbiter and a second arbiter. The memory is utilized for storing data. The first processing unit is utilized for executing a first program. The second processing unit is utilized for executing a second program. The first arbiter is coupled to the first processing unit and the second processing unit and utilized for deciding an operation order for the first processing unit and the second processing unit. The second arbiter is coupled to the first processing unit, the second processing unit and the memory and utilized for deciding a memory accessing order for the first processing unit and the second processing unit.

18 Claims, 6 Drawing Sheets

MICROPROCESSOR DEVICE AND RELATED METHOD FOR A LIQUID CRYSTAL DISPLAY CONTROLLER

BACKGROUND OF THE INVENTION

1. Field of the Invention

The present invention relates to a microprocessor device for a liquid crystal display controller, and more particularly, to a microprocessor device for saving resources and component cost by utilizing arbiters in the microprocessor device.

2. Description of the Prior Art

A microprocessor device is the core of an electronic device and is usually composed of at least one microprocessor. Under the structure of dual microprocessors, each microprocessor works independently in software or in hardware. Please refer to FIG. 1, which illustrates a block diagram of a microprocessor device 10 according to the prior art. The microprocessor device 10 comprises a master microprocessor 100, a slave microprocessor 102, a first memory 104, a second memory 106, a master program code memory 108 and a slave program code memory 110. The master microprocessor 100 is coupled to the first memory 104 and the master program code memory 108, and utilized for executing the program stored in the master program code memory 108 and accessing the first memory 104. Similarly, the slave microprocessor 102 is coupled to the second memory 106 and the slave program code memory 110, and utilized for executing the program stored in the slave program code memory 110 and accessing the second memory 106. There is no electrical connection or communication between the master microprocessor 100 and the slave microprocessor 102 so that the operation of the master microprocessor 100 and the slave microprocessor 102 are independent of each other.

Generally, the microprocessor device 10 works well under normal data loading. However, the efficiency of the microprocessor device 10 may be decreased by heavy data loading because the operation of the master microprocessor 100 and the slave microprocessor 102 are independent of each other. For example, when the microprocessor device 10 is applied to a liquid crystal display (LCD) controller, the master microprocessor 100 cannot handle other tasks at the same time when operating image scaling. On the other hand, the master microprocessor 100 and the slave microprocessor 102 do not share the same memory. Therefore, the memory resource allocation is not optimized so that production cost of the microprocessor device 10 cannot be reduced.

SUMMARY OF THE INVENTION

It is therefore a primary objective of the claimed invention to provide a microprocessor device for an LCD controller, for enhancing the efficiency of the LCD controller and reducing production cost.

The present invention discloses a microprocessor device for an LCD controller comprising a memory, a first processing unit, a second processing unit, a first arbiter and a second arbiter. The memory is utilized for storing data. The first processing unit is utilized for executing a first program. The second processing unit is utilized for executing a second program. The first arbiter is coupled to the first processing unit and the second processing unit and utilized for deciding an operation order for the first processing unit and the second processing unit. The second arbiter is coupled to the first processing unit, the second processing unit and the memory and utilized for deciding a memory accessing order for the first processing unit and the second processing unit.

The present invention further discloses a liquid crystal display device for reducing production cost comprising a panel, a driving device and a microprocessor device. The driving device is coupled to the panel and utilized for controlling the panel to display images. The microprocessor device is coupled to the driving device and utilized for controlling the driving device. The microprocessor device comprises a memory, a first processing unit, a second processing unit, a first arbiter and a second arbiter. The memory is utilized for storing data. The first processing unit is utilized for executing a first program. The second processing unit is utilized for executing a second program. The first arbiter is coupled to the first processing unit and the second processing unit and utilized for deciding an operation order for the first processing unit and the second processing unit. The second arbiter is coupled to the first processing unit, the second processing unit and the memory and utilized for deciding a memory accessing order for the first processing unit and the second processing unit.

The present invention further discloses a method for a microprocessor device of an LCD controller, wherein the microprocessor device comprises a first arbiter, a second arbiter, a first processing unit, a second processing unit and a memory. The method comprises generating a first schedule for deciding an execution order for a first program corresponding to the first processing unit and a second program corresponding to the second processing unit, and generating a second schedule for deciding a memory accessing order for the first processing unit and the second processing unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
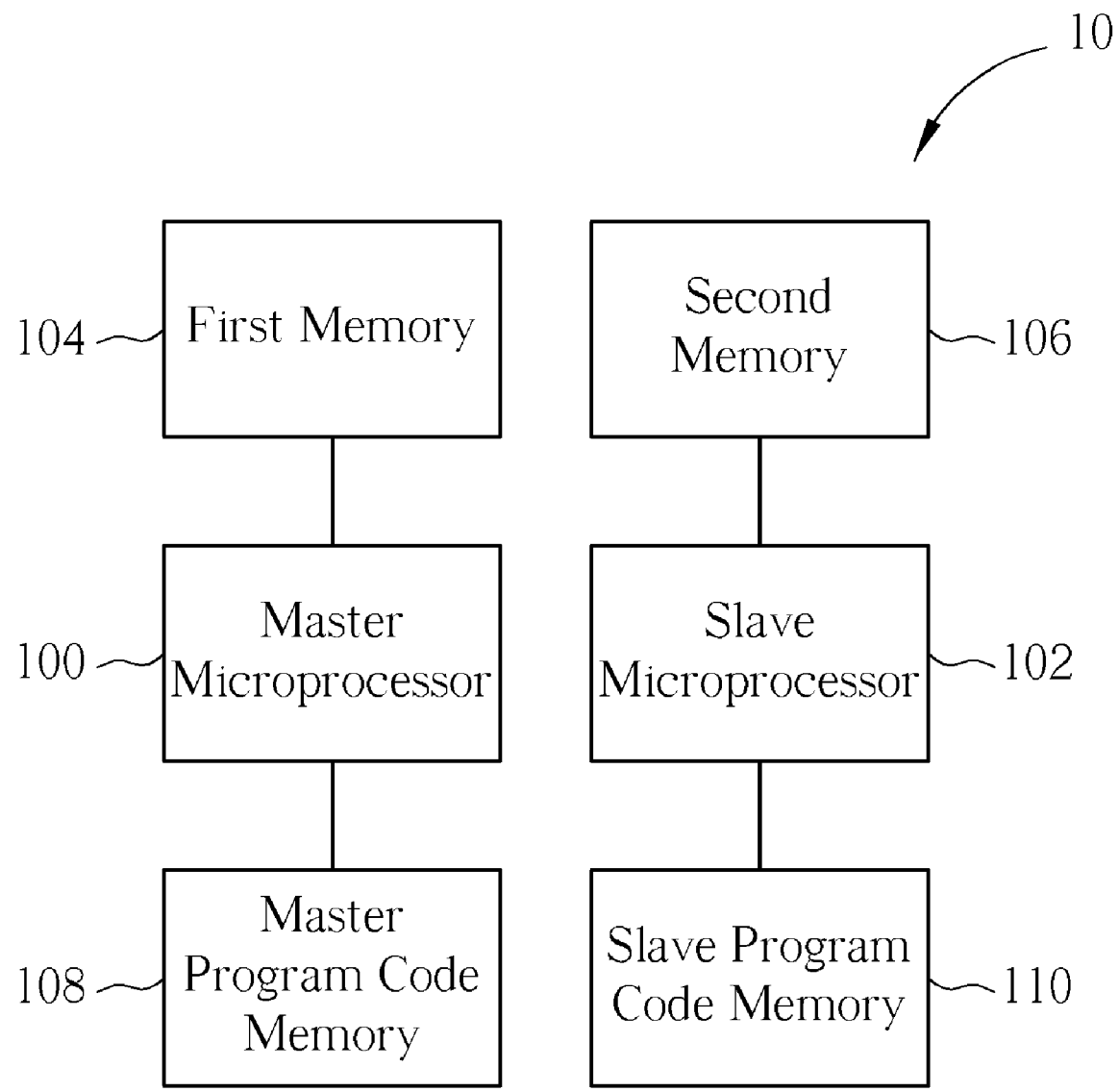
FIG. 1 is a block diagram of a microprocessor device according to the prior art.
Figure 2:
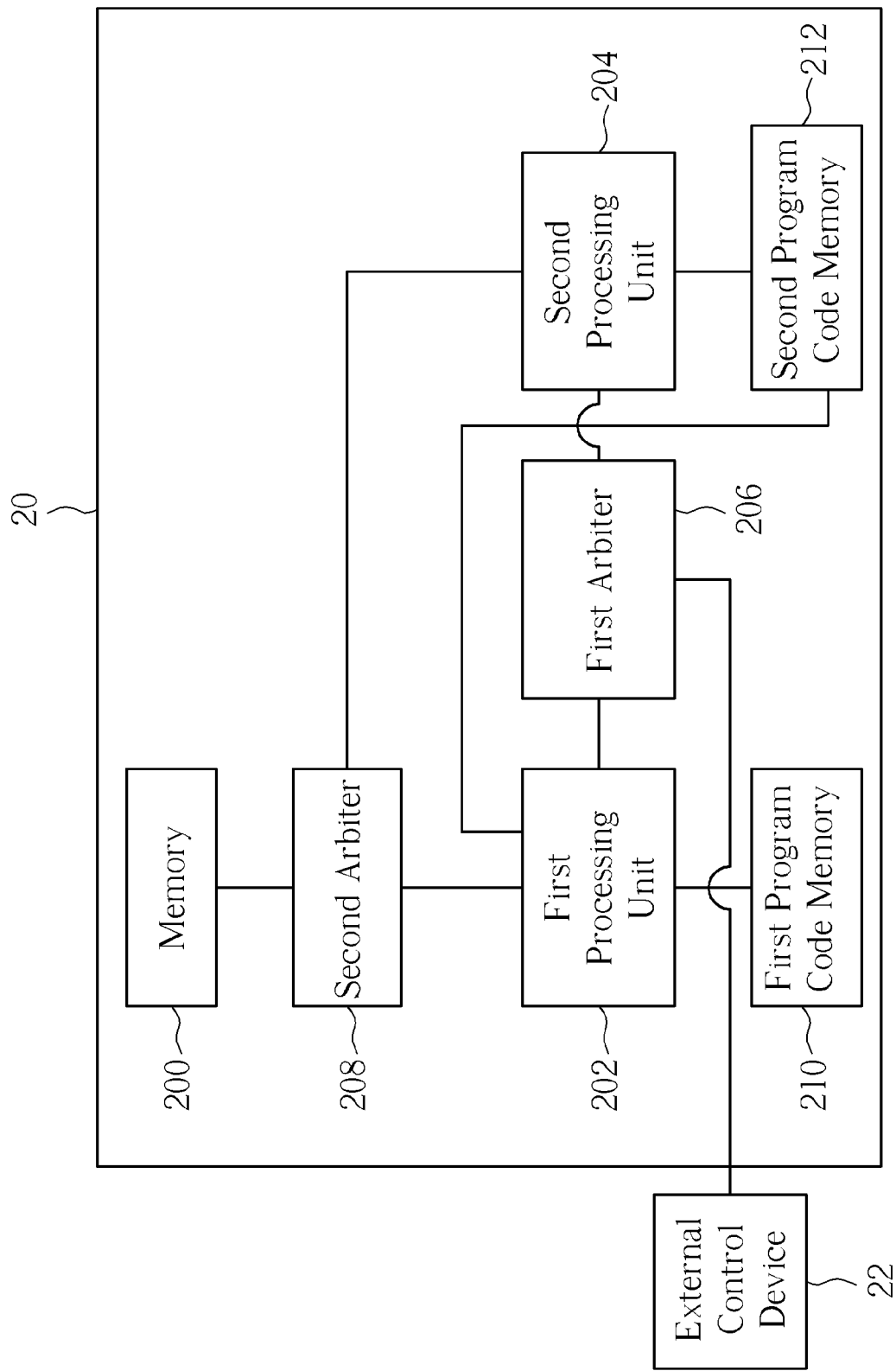
FIG. 2 is a block diagram of a microprocessor device according to an embodiment of the present invention.

Please refer to FIG. 2, which illustrates a block diagram of a microprocessor device 20 according to an embodiment of the present invention. The microprocessor device 20 is utilized for an LCD controller and comprises a memory 200, a first processing unit 202, a second processing unit 204, a first arbiter 206, a second arbiter 208, a first program code memory 210 and a second program code memory 212. The memory 200 is utilized for storing data for the first processing unit 202 and the second processing unit 204. The first processing unit 202 is utilized for executing a first program. The second processing unit 204 is utilized for executing a second program. The first arbiter 206 is coupled to the first processing unit 202, the second processing unit 204 and an external control device 22, and utilized for deciding an operation order for the first processing unit 202, the second processing unit 204 and the external control device 22 (e.g. a computer.) The second arbiter 208 is coupled to the first processing unit 202, the second processing unit 204 and the memory 200, and utilized for deciding a memory accessing order for the first processing unit 202 and the second processing unit 204. The first program code memory 210 is coupled to the first processing unit 202 and utilized for storing the first program used by the first processing unit 202. The second program code memory 212 is coupled to the first processing unit 202 and the second processing unit 204 and utilized for storing the second program used by the second processing unit 204.

Figure 3:
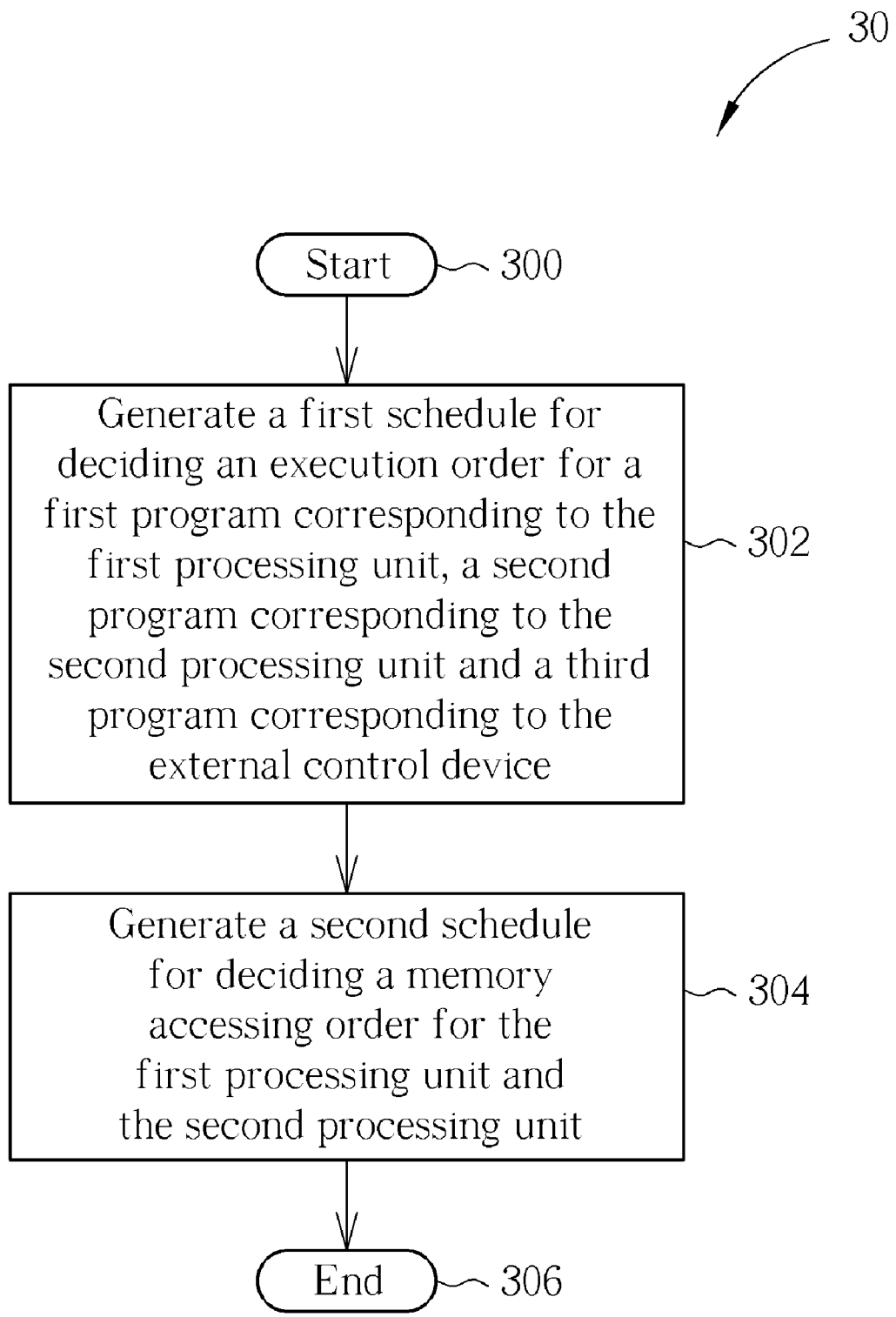
FIG. 3 is a flowchart of a process according to an embodiment of the present invention.

In a word, the microprocessor device 20 decides the operation order for the first processing unit 202, the second processing unit 204 and the external control device 22 via the first arbiter 206, and decides the memory accessing order for the first processing unit 202 and the second processing unit 204 for accessing the memory 200 via the second arbiter 208. In the microprocessor device 20, the first processing unit 202 is used as a master microprocessor and the second processing unit 204 is used as a slave microprocessor. Please refer to FIG. 3 for detailed operation of the microprocessor device 20. FIG. 3 is a flowchart of a process 30 according to an embodiment of the present invention. The process 30 is utilized for the microprocessor device 20, for controlling operations of the first arbiter 206 and the second arbiter 208. The process 30 comprises the following steps:

Step 300: Start.

Step 302: Generate a first schedule for deciding an execution order for a first program corresponding to the first processing unit 202, a second program corresponding to the second processing unit 204 and a third program corresponding to the external control device 22.

Step 304: Generate a second schedule for deciding a memory accessing order for the first processing unit 202 and the second processing unit 204.

Step 306: End.

The operation of the microprocessor device 20 is described as follows. When the microprocessor device 20 is turned on, the first processing unit 202 firstly resets the second processing unit 204 to an initial state, for clearing data stored in the second processing unit 204. Next, the first processing unit 202 takes the second program used by the second processing unit 204 from the first program code memory 210 and writes the second program to the second program code memory 212. In other words, besides the way of pre-recording the second program in the second program code memory 212, the second program also can be stored in the first program code memory 210 and be written to the second program code memory 212 via the first processing unit 202 when required. Thereby, the second program can be substituted for a new program via the first processing unit 202 depends on the situation. Next, the first processing unit 202 starts to execute the first program and control the second processing unit 204 to execute the second program. The first processing unit 202 exchanges control signals with the second processing unit 204 via the first arbiter 206. Note that, when the first processing unit 202, the second processing unit 204 and the external control device 22 send requests to the first arbiter 206 at the same time, the microprocessor device 20 uses the process 30 for generating the first schedule via the first arbiter 206 for deciding the operation order for the first processing unit 202, the second processing unit 204 and the external control device 22. Next, the microprocessor device 20 uses the process 30 for generating the second schedule via the second arbiter 208 for deciding the memory accessing order for the first processing unit 202 and the second processing unit 204.

From the above, according to the process 30, the microprocessor device 20 generates the first schedule via the first arbiter 206 and generates the second schedule via the second arbiter 208. As a result, communication between the first processing unit 202 and the second processing unit 204 will be more convenient and faster. In addition, the first processing unit 202 and the second processing unit 204 share the memory 200 so that memory resource allocation is optimized, so as to reduce production cost of the microprocessor device 20. Take an image-scaling function for an LCD controller as an example, the first processing unit 202 writes an image-scaling program to the second program code memory 212 and controls the second processing unit 204 via the first arbiter 206 to execute the image-scaling program for calculating scaling parameters more efficiently. Next, the second processing unit 204 writes the scaling parameters to the memory 200 via the second arbiter 208. The first processing unit 202 takes the scaling parameters from the memory 200 when required. Preferably, the first processing unit 202 does not need to wait for the image-scaling program done to execute another program when the second processing unit 204 is executing the image-scaling program.

Figure 4:
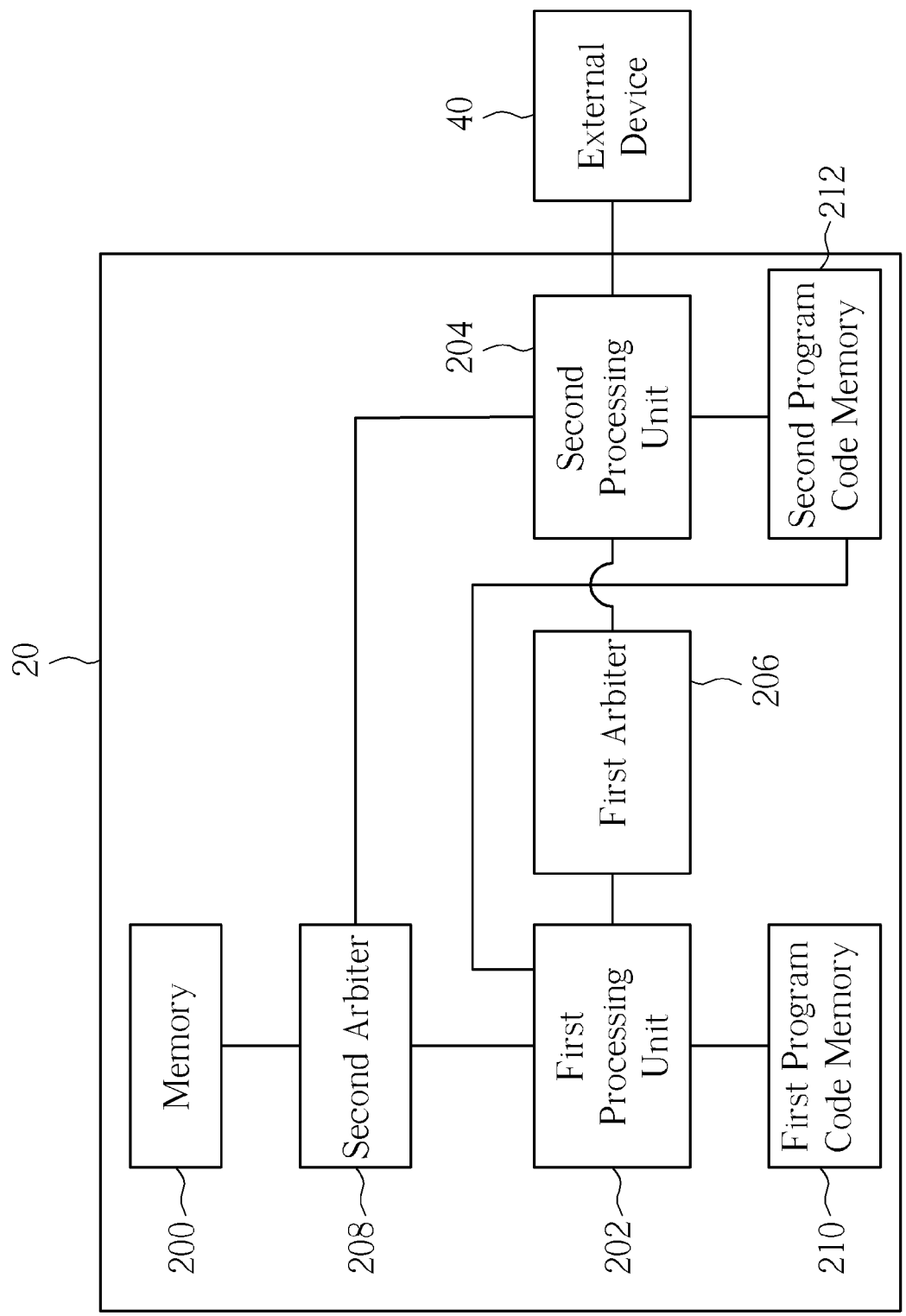
FIG. 4 is a block diagram of a microprocessor device according to an embodiment of the present invention.

Note that, the microprocessor device 20 in FIG. 2, is one of embodiments of the present invention, and those skilled in the art can make alterations and modifications accordingly. Please refer to FIG. 4, which illustrates a block diagram of the microprocessor device 20 with alterations. In FIG. 4, the microprocessor device 20 is coupled to an external device 40. For example, the second processing unit 204 can be a consumer electronic control (CEC) encoder/decoder and the external device 40 can be a high definition multimedia interface (HDMI) device. When the external device 40 transmits data to the second processing unit 204, the second processing unit 204 performs a data processing procedure on the transmitted data, transmits data back to the external device 40 and also transmits the data to the first processing unit 202. In other words, the first processing unit 202 does not need to detect the external device 40 frequently and does not perform a data processing procedure by itself. The first processing unit 202 only receives the data transmitted from the second processing unit 204. If required, the second processing unit 204 writes the data to the memory 200 via the second arbiter 208 for the use for the first processing unit 202.

Figure 5:
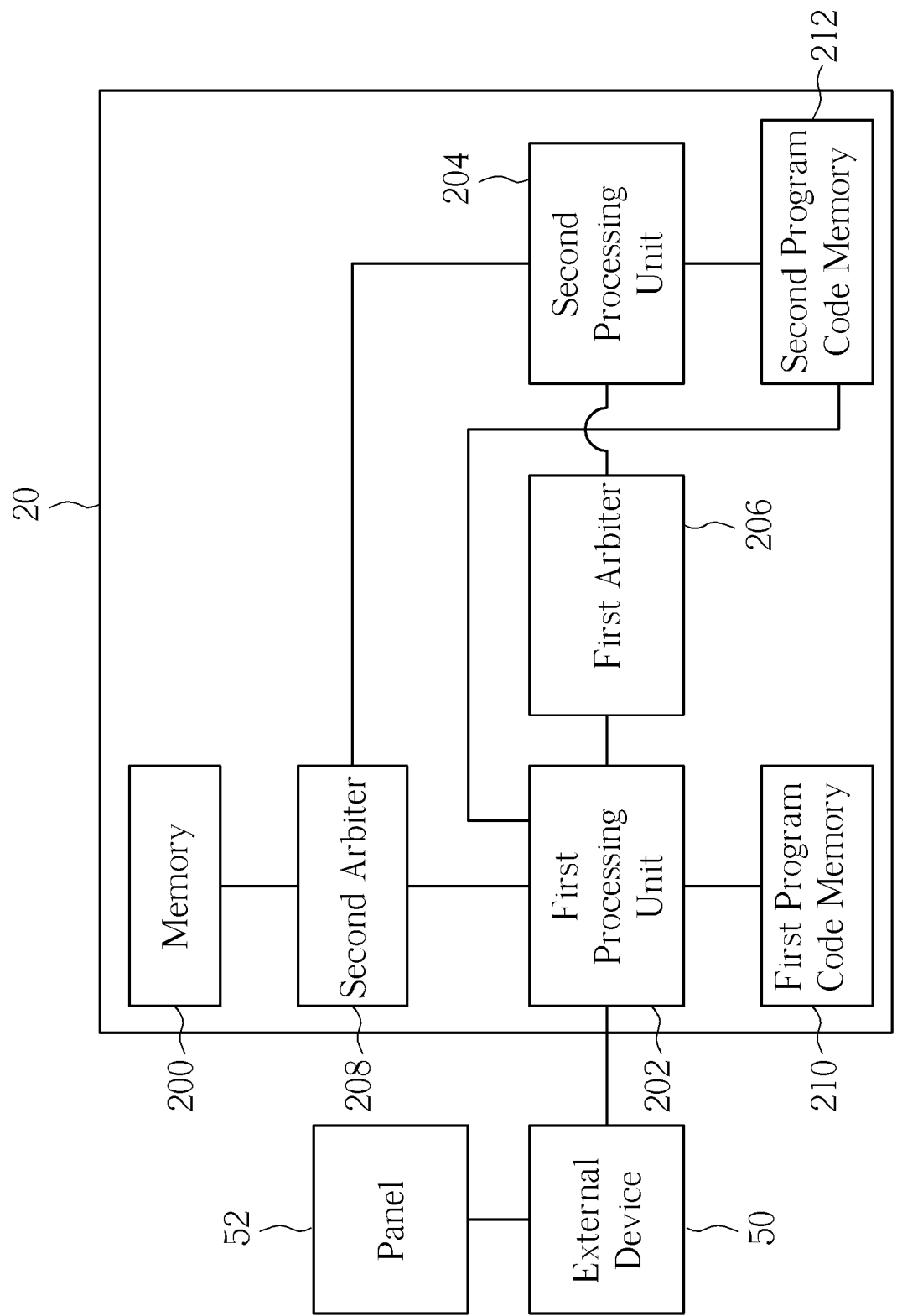
FIG. 5 is a block diagram of a microprocessor device according to an embodiment of the present invention.

Please refer to FIG. 5, which illustrates a block diagram of the microprocessor device 20 with alterations. In FIG. 5, the first processing unit 202 is further coupled to an external device 50 which is coupled to a panel 52. For example, the second processing unit 204 can be an automatic contrast enhancement (ACE) accelerator and the external device 50 can be a scaler. When the first processing unit 202 wants to perform an ACE operation, the first processing unit 202 takes related parameters from the external device 50 and writes the related parameters to the memory 200. At the same time, the first processing unit 202 controls the second processing unit 204 to take the related parameters from the memory 200 to execute the ACE operation. After the second processing unit 204 completes the ACE operation, the second processing unit 204 writes an operation result to the memory 200 and informs the first processing unit 202 that the ACE operation is completed. The first processing unit 202 takes the operation result from the memory 200 and transmits the operation result to the external device 50, thereby controls the contrast ratio of the panel 52. Therefore, the operation loading of first processing unit 202 is decreased by the help of the second processing unit 204.

Figure 6:
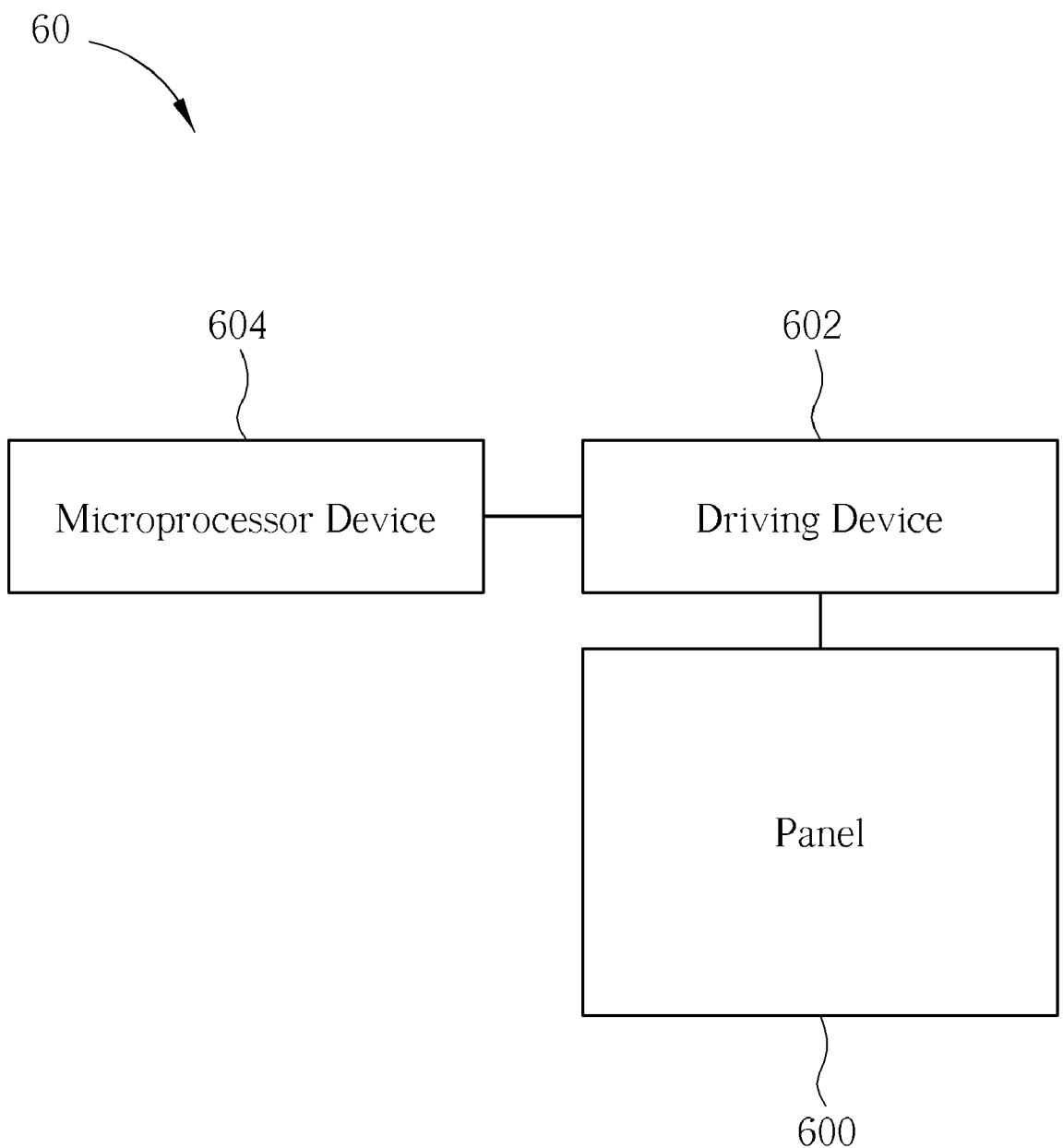
FIG. 6 is a block diagram of an LCD device according to an embodiment of the present invention.

Please refer to FIG. 6, which illustrates a block diagram of an LCD device 60 for reducing production cost according to an embodiment of the present invention. The LCD device 60 comprises a panel 600, a driving device 602 and a microprocessor device 604. The driving device 602 is coupled to the panel 600 and utilized for controlling the panel 600 to display images. The microprocessor device 604 is coupled to the driving device 602 and utilized for controlling the driving device 602. The microprocessor device 604 is identical to the microprocessor device 20 in FIG. 2 so that the detailed microprocessor device 604 is not given here. As a result, the microprocessor device 604 makes memory resource allocation optimized, so as to reduce production cost of the LCD device 60.

In conclusion, the embodiment of the present invention generates schedules via arbiters, for simplifying and accelerating the communication among a master microprocessor and a slave microprocessor of a microprocessor device and an external control device, and for sharing memory for the master microprocessor and the slave microprocessor. As a result, memory resource allocation of the microprocessor device is optimized so that production cost of the microprocessor device and related LCD device is reduced.

Those skilled in the art will readily observe that numerous modifications and alterations of the device and method may be made while retaining the teachings of the invention.

What is claimed is:

1. A microprocessor device for an LCD controller comprising:
    a memory for storing data;
    a first processing unit for executing a first program;
    a second processing unit for executing a second program;
    a first arbiter coupled to an external control device, the first processing unit, and the second processing unit, for deciding an operation order for the external control device, the first processing unit and the second processing unit; and
    a second arbiter coupled to the first processing unit, the second processing unit and the memory, for deciding a memory accessing order for the first processing unit and the second processing unit.

2. The microprocessor device of claim 1, wherein the external control device is a computer system.

3. The microprocessor device of claim 1, further comprising a first program memory coupled to the first processing unit, for storing the first program.

4. The microprocessor device of claim 1, further comprising a second program memory coupled to the first processing unit and the second processing unit, for storing the second program.

5. The microprocessor device of claim 4, wherein the second program is outputted by the first processing unit.

6. A liquid crystal display (LCD) device for reducing production cost comprising:
    a panel;
    a driving device coupled to the panel, for controlling the panel to display images; and
    a microprocessor device coupled to the driving device, for controlling the driving device, comprising:
        a memory for storing data;
        a first processing unit for executing a first program;
        a second processing unit for executing a second program;
        a first arbiter coupled to the first processing unit and the second processing unit, for deciding an operation order for the first processing unit and the second processing unit; and
        a second arbiter coupled to the first processing unit, the second processing unit and the memory, for deciding a memory accessing order for the first processing unit and the second processing unit.

7. The LCD device of claim 6, wherein the first arbiter is further coupled to an external control device, for deciding an operation order for the first processing unit, the second processing unit and the external control device.

8. The LCD device of claim 7, wherein the external control device is a computer system.

9. The LCD device of claim 6, further comprising a first program memory coupled to the first processing unit, for storing the first program.

10. The LCD device of claim 6, further comprising a second program memory coupled to the first processing unit and the second processing unit, for storing the second program.

11. The LCD device of claim 10, wherein the second program is outputted by the first processing unit.

12. A method for a microprocessor device of an LCD controller, wherein the microprocessor device comprises a first arbiter, a second arbiter, a first processing unit, a second processing unit and a memory, the method comprising:
    generating a first schedule for deciding an execution order for a first program corresponding to the first processing unit, a second program corresponding to the second processing unit, and a third program corresponding to an external control device; and
    generating a second schedule for deciding a memory accessing order for the first processing unit and the second processing unit.

13. The method of claim 12, wherein the first schedule is generated by the first arbiter.

14. The method of claim 12, wherein the second schedule is generated by the second arbiter.

15. The method of claim 12, wherein the external control device is a computer system.

16. The method of claim 12, further comprising a first program memory coupled to the first processing unit, for storing the first program.

17. The method of claim 12, further comprising a second program memory coupled to the first processing unit and the second processing unit, for storing the second program.

18. The method of claim 17, wherein the second program is outputted by the first processing unit.

* * * * *